(12) United States Patent
Hotelling et al.

(10) Patent No.: US 8,816,984 B2
(45) Date of Patent: *Aug. 26, 2014

(54) MULTIPOINT TOUCH SURFACE CONTROLLER

(75) Inventors: Steven P. Hotelling, Los Gatos, CA (US); Christoph H. Krah, Los Altos, CA (US); Brian Quentin Huppi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,898

(22) Filed: Aug. 27, 2012

(65) Prior Publication Data

US 2012/0319996 A1    Dec. 20, 2012

Related U.S. Application Data

(63) Continuation of application No. 11/381,313, filed on May 2, 2006, now Pat. No. 8,279,180.

(51) Int. Cl.
*G06F 3/041* (2006.01)

(52) U.S. Cl.
USPC .......................................................... 345/173

(58) Field of Classification Search
CPC ................................. G06F 3/044; G06F 3/047
USPC .................................................. 345/173–178
See application file for complete search history.

(56) References Cited

U.S. PATENT DOCUMENTS 3,333,160 A    7/1967  Gorski
3,541,541 A   11/1970  Englebart
3,662,105 A    5/1972  Hurst et al.
3,798,370 A    3/1974  Hurst
4,246,452 A    1/1981  Chandler
4,476,463 A   10/1984  Ng et al.
4,511,760 A    4/1985  Garwin
4,543,564 A    9/1985  Audoin et al.
4,550,221 A   10/1985  Mabusth
4,672,364 A    6/1987  Lucas
4,672,558 A    6/1987  Beckes et al.
4,692,809 A    9/1987  Beining et al.
4,695,827 A    9/1987  Beining et al.
4,733,222 A    3/1988  Evans (Continued)

FOREIGN PATENT DOCUMENTS

CA    1243096    10/1988
DE    102 51 296    5/2004

(Continued)

OTHER PUBLICATIONS

Anonymous. (Apr. 13, 2004). Proximity Sensor Demo Kit, User Guide, Version 0.62—Preliminary, Integration Associates, Inc., 14 pages.

(Continued)

*Primary Examiner* — Jonathan Horner
(74) *Attorney, Agent, or Firm* — Morrison & Foerster LLP

(57) ABSTRACT

A multipoint touch surface controller is disclosed herein. The controller includes an integrated circuit including output circuitry for driving a capacitive multi-touch sensor and input circuitry for reading the sensor. Also disclosed herein are various noise rejection and dynamic range enhancement techniques that permit the controller to be used with various sensors in various conditions without reconfiguring hardware.

14 Claims, 12 Drawing Sheets

(56) References Cited

U.S. PATENT DOCUMENTS

| | | |
|---|---|---|
| 4,734,685 A | 3/1988 | Watanabe |
| 4,746,770 A | 5/1988 | McAvinney |
| 4,771,276 A | 9/1988 | Parks |
| 4,788,384 A | 11/1988 | Bruere-Dawson et al. |
| 4,806,846 A | 2/1989 | Kerber |
| 4,898,555 A | 2/1990 | Sampson |
| 4,902,886 A | 2/1990 | Smisko |
| 4,968,877 A | 11/1990 | McAvinney et al. |
| 5,003,519 A | 3/1991 | Noirjean |
| 5,017,030 A | 5/1991 | Crews |
| 5,117,071 A | 5/1992 | Greanias et al. |
| 5,178,477 A | 1/1993 | Gambaro |
| 5,189,403 A | 2/1993 | Franz et al. |
| 5,194,862 A | 3/1993 | Edwards |
| 5,224,861 A | 7/1993 | Glass et al. |
| 5,241,308 A | 8/1993 | Young |
| 5,252,951 A | 10/1993 | Tannenbaum et al. |
| 5,281,966 A | 1/1994 | Walsh |
| 5,305,017 A * | 4/1994 | Gerpheide ............... 345/174 |
| 5,345,543 A | 9/1994 | Capps et al. |
| 5,349,303 A | 9/1994 | Gerpheide |
| 5,357,266 A * | 10/1994 | Tagawa ............... 345/173 |
| 5,376,948 A | 12/1994 | Roberts |
| 5,398,310 A | 3/1995 | Tchao et al. |
| 5,442,742 A | 8/1995 | Greyson et al. |
| 5,463,388 A | 10/1995 | Boie et al. |
| 5,463,696 A | 10/1995 | Beernink et al. |
| 5,483,261 A | 1/1996 | Yasutake |
| 5,488,204 A | 1/1996 | Mead et al. |
| 5,495,077 A | 2/1996 | Miller et al. |
| 5,513,309 A | 4/1996 | Meier et al. |
| 5,523,775 A | 6/1996 | Capps |
| 5,530,455 A | 6/1996 | Gillick et al. |
| 5,543,590 A | 8/1996 | Gillespie et al. |
| 5,543,591 A | 8/1996 | Gillespie et al. |
| 5,563,632 A | 10/1996 | Roberts |
| 5,563,996 A | 10/1996 | Tchao |
| 5,565,658 A | 10/1996 | Gerpheide et al. |
| 5,579,036 A | 11/1996 | Yates, IV |
| 5,581,681 A | 12/1996 | Tchao et al. |
| 5,583,946 A | 12/1996 | Gourdol |
| 5,590,219 A | 12/1996 | Gourdol |
| 5,592,566 A | 1/1997 | Pagallo et al. |
| 5,594,810 A | 1/1997 | Gourdol |
| 5,596,694 A | 1/1997 | Capps |
| 5,612,719 A | 3/1997 | Beernink et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,642,108 A | 6/1997 | Gopher et al. |
| 5,644,657 A | 7/1997 | Capps et al. |
| 5,666,113 A | 9/1997 | Logan |
| 5,666,502 A | 9/1997 | Capps |
| 5,666,552 A | 9/1997 | Greyson et al. |
| 5,675,361 A | 10/1997 | Santilli |
| 5,677,710 A | 10/1997 | Thompson-Rohrlich |
| 5,689,253 A | 11/1997 | Hargreaves et al. |
| 5,710,844 A | 1/1998 | Capps et al. |
| 5,729,250 A | 3/1998 | Bishop et al. |
| 5,730,165 A | 3/1998 | Philipp |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,748,269 A | 5/1998 | Harris et al. |
| 5,764,222 A | 6/1998 | Shieh |
| 5,764,818 A | 6/1998 | Capps et al. |
| 5,767,457 A | 6/1998 | Gerpheide et al. |
| 5,767,842 A | 6/1998 | Korth |
| 5,790,104 A | 8/1998 | Shieh |
| 5,790,107 A | 8/1998 | Kasser et al. |
| 5,802,516 A | 9/1998 | Shwarts et al. |
| 5,808,567 A | 9/1998 | McCloud |
| 5,809,267 A | 9/1998 | Moran et al. |
| 5,821,690 A | 10/1998 | Martens et al. |
| 5,821,930 A | 10/1998 | Hansen |
| 5,823,782 A | 10/1998 | Marcus et al. |
| 5,825,351 A | 10/1998 | Tam |
| 5,825,352 A | 10/1998 | Bisset et al. |
| 5,831,600 A | 11/1998 | Inoue et al. |
| 5,835,079 A | 11/1998 | Shieh |
| 5,854,625 A | 12/1998 | Frisch et al. |
| 5,880,411 A | 3/1999 | Gillespie et al. |
| 5,892,540 A | 4/1999 | Kozlowski et al. |
| 5,898,434 A | 4/1999 | Small et al. |
| 5,920,309 A | 7/1999 | Bisset et al. |
| 5,923,319 A | 7/1999 | Bishop et al. |
| 5,933,134 A | 8/1999 | Shieh |
| 5,943,044 A | 8/1999 | Martinelli et al. |
| 6,002,389 A | 12/1999 | Kasser |
| 6,002,808 A | 12/1999 | Freeman |
| 6,020,881 A | 2/2000 | Naughton et al. |
| 6,031,524 A | 2/2000 | Kunert |
| 6,037,882 A | 3/2000 | Levy |
| 6,050,825 A | 4/2000 | Nichol et al. |
| 6,052,339 A | 4/2000 | Frenkel et al. |
| 6,072,494 A | 6/2000 | Nguyen |
| 6,075,520 A | 6/2000 | Inoue et al. |
| 6,084,576 A | 7/2000 | Leu et al. |
| 6,100,827 A | 8/2000 | Boesch et al. |
| 6,107,997 A | 8/2000 | Ure |
| 6,128,003 A | 10/2000 | Smith et al. |
| 6,131,299 A | 10/2000 | Raab et al. |
| 6,135,958 A | 10/2000 | Mikula-Curtis et al. |
| 6,144,380 A | 11/2000 | Shwarts et al. |
| 6,188,391 B1 | 2/2001 | Seely et al. |
| 6,198,515 B1 | 3/2001 | Cole |
| 6,201,573 B1 | 3/2001 | Mizuno |
| 6,208,329 B1 | 3/2001 | Ballare |
| 6,222,465 B1 | 4/2001 | Kumar et al. |
| 6,239,788 B1 | 5/2001 | Nohno et al. |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,288,707 B1 | 9/2001 | Philipp |
| 6,289,326 B1 | 9/2001 | LaFleur |
| 6,292,178 B1 | 9/2001 | Bernstein et al. |
| 6,300,613 B1 | 10/2001 | Kuderer |
| 6,310,610 B1 | 10/2001 | Beaton et al. |
| 6,323,846 B1 | 11/2001 | Westerman et al. |
| 6,339,363 B1 | 1/2002 | Fowler |
| 6,347,290 B1 | 2/2002 | Bartlett |
| 6,377,009 B1 | 4/2002 | Philipp |
| 6,380,931 B1 | 4/2002 | Gillespie et al. |
| 6,411,287 B1 | 6/2002 | Scharff et al. |
| 6,414,671 B1 | 7/2002 | Gillespie et al. |
| 6,421,234 B1 | 7/2002 | Ricks et al. |
| 6,452,514 B1 | 9/2002 | Philipp |
| 6,457,355 B1 | 10/2002 | Philipp |
| 6,466,036 B1 | 10/2002 | Philipp |
| 6,515,669 B1 | 2/2003 | Mohri |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,570,557 B1 | 5/2003 | Westerman et al. |
| 6,577,910 B1 | 6/2003 | Eastty et al. |
| 6,593,916 B1 | 7/2003 | Aroyan |
| 6,610,936 B2 | 8/2003 | Gillespie et al. |
| 6,624,833 B1 | 9/2003 | Kumar et al. |
| 6,639,577 B2 | 10/2003 | Eberhard |
| 6,650,319 B1 | 11/2003 | Hurst et al. |
| 6,658,994 B1 | 12/2003 | McMillan |
| 6,670,894 B2 | 12/2003 | Mehring |
| 6,677,932 B1 | 1/2004 | Westerman |
| 6,677,934 B1 | 1/2004 | Blanchard |
| 6,690,387 B2 | 2/2004 | Zimmerman et al. |
| 6,724,366 B2 | 4/2004 | Crawford |
| 6,747,264 B2 | 6/2004 | Miida |
| 6,757,002 B1 | 6/2004 | Oross et al. |
| 6,803,906 B1 | 10/2004 | Morrison et al. |
| 6,842,672 B1 | 1/2005 | Straub et al. |

(56) References Cited

U.S. PATENT DOCUMENTS

| | | |
|---|---|---|
| 6,856,259 B1 | 2/2005 | Sharp |
| 6,888,536 B2 | 5/2005 | Westerman et al. |
| 6,900,795 B1 | 5/2005 | Knight, III et al. |
| 6,927,761 B2 | 8/2005 | Badaye et al. |
| 6,942,571 B1 | 9/2005 | McAllister et al. |
| 6,965,375 B1 | 11/2005 | Gettemy et al. |
| 6,972,401 B2 | 12/2005 | Akitt et al. |
| 6,977,666 B1 | 12/2005 | Hedrick |
| 6,985,801 B1 | 1/2006 | Straub et al. |
| 6,992,659 B2 | 1/2006 | Gettemy |
| 7,015,894 B2 | 3/2006 | Morohoshi |
| 7,031,228 B2 | 4/2006 | Born et al. |
| 7,031,886 B1* | 4/2006 | Hargreaves ............... 702/191 |
| 7,184,064 B2 | 2/2007 | Zimmerman et al. |
| 7,219,829 B2 | 5/2007 | Treat |
| RE40,153 E | 3/2008 | Westerman et al. |
| 7,378,856 B2 | 5/2008 | Peine et al. |
| 7,663,607 B2 | 2/2010 | Hotelling et al. |
| 8,279,180 B2* | 10/2012 | Hotelling et al. ............ 345/173 |
| 8,479,122 B2 | 7/2013 | Hotelling et al. |
| 2002/0118848 A1 | 8/2002 | Karpenstein |
| 2003/0006974 A1 | 1/2003 | Clough et al. |
| 2003/0067447 A1 | 4/2003 | Geaghan et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0095095 A1 | 5/2003 | Pihlaja |
| 2003/0095096 A1 | 5/2003 | Robbin et al. |
| 2003/0098858 A1 | 5/2003 | Perski et al. |
| 2003/0206202 A1 | 11/2003 | Moriya |
| 2003/0234768 A1 | 12/2003 | Rekimoto et al. |
| 2004/0187577 A1 | 9/2004 | Higuchi et al. |
| 2004/0263484 A1 | 12/2004 | Mantysalo et al. |
| 2005/0012723 A1 | 1/2005 | Pallakoff |
| 2005/0052425 A1 | 3/2005 | Zadesky et al. |
| 2005/0068044 A1 | 3/2005 | Peine et al. |
| 2005/0089120 A1 | 4/2005 | Quinlan et al. |
| 2005/0104867 A1 | 5/2005 | Westerman et al. |
| 2005/0110768 A1 | 5/2005 | Marriott et al. |
| 2005/0243893 A1 | 11/2005 | Ranganathan et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033007 A1 | 2/2006 | Terzioglu |
| 2006/0033724 A1 | 2/2006 | Chaudhri et al. |
| 2006/0044259 A1 | 3/2006 | Hotelling et al. |
| 2006/0053387 A1 | 3/2006 | Ording |
| 2006/0066582 A1 | 3/2006 | Lyon et al. |
| 2006/0085757 A1 | 4/2006 | Andre et al. |
| 2006/0097991 A1 | 5/2006 | Hotelling et al. |
| 2006/0133600 A1 | 6/2006 | Holcombe |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2007/0007438 A1 | 1/2007 | Liu et al. |
| 2007/0176609 A1 | 8/2007 | Ely et al. |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2008/0297476 A1 | 12/2008 | Hotelling et al. |
| 2009/0315850 A1 | 12/2009 | Hotelling et al. |
| 2009/0315851 A1 | 12/2009 | Hotelling et al. |

FOREIGN PATENT DOCUMENTS

| | | |
|---|---|---|
| EP | 0 288 692 | 11/1988 |
| EP | 0 464 908 | 1/1992 |
| EP | 0 664 504 | 7/1995 |
| EP | 1 014 295 | 6/2000 |
| EP | 1 211 633 | 6/2002 |
| JP | 57-176448 A | 10/1982 |
| JP | 61-115118 A | 6/1986 |
| JP | 11-110116 A | 4/1999 |
| JP | 11-143626 A | 5/1999 |
| JP | 11-305932 A | 11/1999 |
| JP | 2000-163031 A | 6/2000 |
| JP | 2002-342033 A | 11/2002 |
| JP | 2005-507083 A | 3/2005 |
| WO | WO-96/18179 | 6/1996 |
| WO | WO-97/18547 | 5/1997 |
| WO | WO-97/23738 | 7/1997 |
| WO | WO-98/14863 | 4/1998 |
| WO | WO-03/088176 | 10/2003 |
| WO | WO-2006/023569 | 3/2006 |
| WO | WO-2007/130771 | 11/2007 |

OTHER PUBLICATIONS

Anonymous. "Surface Acoustic Wave Touchscreens" obtained from http://www.touchscreens.com/intro-touchtypes-saw.html generated Aug. 5, 2005.

Anonymous. "Touch Technologies Overview" 2001, 3M Touch Systems, Massachusetts.

Anonymous. "4-Wire Resistive Touchscreens" obtained from http://www.touchscreens.com/intro-touchtypes-4resistive.html generated Aug. 5, 2005.

Anonymous. "5-Wire Resistive Touchscreens" obtained from http://www.touchscreens.com/intro-touchtypes-resistive.html generated Aug. 5, 2005.

Anonymous. "A Brief Overview of Gesture Recognition" obtained from http://www. Dai. Ed. Ac.uk/Cvonline/LOCA_COPIES/COHEN/gesture_overview. Html, generated Apr. 20, 2004.

Anonymous. "Capacitive Position Sensing" obtained from http://www.synaptics.com/technology/cps.cfin generated Aug. 5, 2005.

Anonymous. "Capacitive Touchscreens" obtained from http://www.touchscreens.com/intro-touchtypes-capacitive.html generated Aug. 5, 2005.

Anonymous. "Comparing Touch Technologies" obtained from http://www.touchscreens.com/intro-touchtypes.html generated Oct. 10, 2004.

Anonymous. "FingerWorks—Gesture Guide—Application Switching," obtained from http://www.fingerworks.com/gesture_guide_apps.html, generated on Aug. 27, 2004,.1-pg.

Anonymous. "FingerWorks—Gesture Guide—Editing," obtained from http://www.fingerworks.com/gesure_guide_editing.html, generated on Aug. 27, 2004, 1-pg.

Anonymous. "FingerWorks—Gesture Guide—File Operations," obtained from http://www.fingerworks.com/gesture_guide_files.html, generated on Aug. 27, 2004, 1-pg.

Anonymous. "FingerWorks—Gesture Guide—Text Manipulation," obtained from http://www.fingerworks.com/gesture_guide_text_manip.html, generated on Aug. 27, 2004, 2-pg.

Anonymous. "FingerWorks—Gesture Guide—Tips and Tricks," obtained from http://www.fingerworks.com/gesture_guide_tips.html, generated Aug. 27, 2004, 2-pgs.

Anonymous. "FingerWorks—Gesture Guide—Web," obtained from http://www.fingerworks.com/gesture_guide_web.html, generated on Aug. 27, 2004, 1-pg.

Anonymous. "FingerWorks—Guide to Hand Gestures for USB Touchpads," obtained from http://www.fingerworks.com/igesture_userguide.html, generated Aug. 27, 2004, 1-pg.

Anonymous. "FingerWorks—iGesture—Technical Details," obtained from http://www.fingerworks.com/igesture_tech.html, generated Aug. 27, 2004, 1-pg.

Anonymous. "FingerWorks—The Only Touchpads with Ergonomic Full-Hand Resting and Relaxation!" obtained from http://www.fingerworks.com/resting.html, Copyright 2001, 1-pg.

(56) References Cited

OTHER PUBLICATIONS

Anonymous. "FingerWorks—Tips for Typing on the Mini," obtained from http://www.fingerworks.com/mini_typing.html, generated on Aug. 27, 2004, 2-pgs.
Anonymous. "G1idePoint®" obtained from http://www.cirque.com/technology/technology_gp.html generated Aug. 5, 2005
Anonymous. "Gesture Recognition" http://www.fingerworks.com/gesture_recognition.htm1>, Jul. 2, 2006.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the MultiFinger USB TouchPad with Whole-Hand Gestures," obtained from http://www.fingerworks.com/igesture.html, generated Aug. 27, 2004, 2-pgs.
Anonymous. "iGesture Products for Everyone (learn in minutes) Product Overview"FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Douglas et al., *The Ergonomics of Computer Pointing Devices* (1997).
European Search Report received in EP 1 621 989 (@ *Beyer Weaver & Thomas, LLP*) dated Mar. 27, 2006.
Evb Elektronik "TSOP6238 IR Receiver Modules for Infrared Remote Control Systems" dated Jan. 2004 1-pg.
Final Office Action mailed Dec. 11, 2009, for U.S. Appl. No. 11/381,313, 29 pages.
Final Office Action mailed Dec. 3, 2010, for U.S. Appl. No. 11/381,313, filed May 2, 2006, 24 pages.
Final Office Action mailed May 9, 2012, for U.S. Appl. No. 12/549,229, filed Aug. 27, 2009, 12 pages.
Fisher et al., "Repetitive Motion Disorders: The Design of Optimal Rate-Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," In CHI 2001 Summary, pp. 121-122, 2001.
GB Combined Search and Examination Report mailed Mar. 21, 2011, for GB Application No. 1101918.9, filed Oct. 24, 2008, four pages.
Hardy, "Fingerworks" Mar. 7, 2002; BBC World on Line.
Hillier and Gerald J. Lieberman, *Introduction to Operations Research* (1986).
Horowitz, P. et al. (1989). "4.19 Integrators, Figure 4.48C," in *The Art of Electronics*, $2^{nd}$ Edition. Cambridge University Press, pp. 222-223.
International Search Report dated Mar. 3, 2006 (PCT/US 05/03325; 119-0052WO).
International Search Report mailed Jan. 11, 2008, for PCT Application No. PCT/US2007/066021, filed Apr. 5, 2007, five pages.
International Search Report received in corresponding PCT application No. PCT/US2006/008349 dated Oct. 6, 2006.
Jacob et al., "Integrality and Separability of Input Devices," *ACM Transactions on Computer-Human Interaction*, 1:3-26 (Mar. 1994).
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-25.]
Lee, "A Fast Multiple-Touch-Sensitive Input Device," Master's Thesis, University of Toronto (1984).
Matsushita et al., "HoloWall: Designing a Finger, Hand, Body and Object Sensitive Wall," In Proceedings of UIST '97, Oct. 1997.
Non Final Office Action mailed Jun. 22, 2009, for U.S. Appl. No. 11/381,313, filed May 2, 2006, 30 pages.
Non Final Office Action mailed Jul. 6, 2010, for U.S. Appl. No. 11/381,313, filed May 2, 2006, 26 pages.
Non Final Office Action mailed Nov. 3, 2011, for U.S. Appl. No. 12/549,229, filed Aug. 27, 2009, 11 pages.
Non Final Office Action mailed Dec. 28, 2011, for U.S. Appl. No. 12/549,269, filed Aug. 27, 2009, 10 pages.
Non Final Office Action mailed Jan. 19, 2012, for U.S. Appl. No. 11/381,313, filed May 2, 2005, 25 pages.
Notice of Allowance mailed May 24, 2012, for U.S. Appl. No. 11/381,313, filed May 2, 2006, eight pages.
Quantum Research Group "QT510 / Qwheel$^{TM}$ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.]
Rubine et al., "Programmable Finger-Tracking Instrument Controllers," *Computer Music Journal*, vol. 14, No. 1 (Spring 1990).
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Rutledge et al., "Force-To-Motion Functions for Pointing," Human-Computer Interaction—INTERACT (1990).
Subatai Ahmad, "A Usable Real-Time 3D Hand Tracker," Proceedings of the $28^{th}$ Asilomar Conference on Signals, Systems and Computers—Part 2 (of2), vol. 2 (Oct. 1994).
Texas Instruments "TSC2003 / I2C Touch Screen Controller" Data Sheet SBAS 162, dated Oct. 2001, 20-pgs.
U.S. Appl. No. 10/789,676, filed Feb. 27, 2004 entitled "Shape Detecting Input Device".
Wellner, "The Digital Desk Calculators: Tangible Manipulation on a Desk Top Display" In ACM UIST '91 Proceedings, pp. 27-34, Nov. 1991.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

(56) References Cited

OTHER PUBLICATIONS

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," In CHI '85 Proceedings, pp. 280-287, 1995.

Final Office Action mailed Nov. 5, 2013, for U.S. Appl. No. 12/549,229, filed Aug. 27, 2009, 11 pages.

Non-Final Office Action mailed Jul. 22, 2013, for U.S. Appl. No. 12/549,229, filed Aug. 27, 2009, 13 pages.

\* cited by examiner

MULTIPOINT TOUCH SURFACE CONTROLLER

CROSS-REFERENCE TO RELATED APPLICATIONS

This Application is a continuation of U.S. patent application Ser. No. 11/381,313, filed on May 2, 2006, the disclosure of which is herein incorporated by reference in its entirety.

BACKGROUND OF THE INVENTION

There exist today many styles of input devices for performing operations in a computer system. The operations generally correspond to moving a cursor and/or making selections on a display screen. By way of example, the input devices may include buttons or keys, mice, trackballs, touch pads, joy sticks, touch screens and the like. Touch pads and touch screens (collectively "touch surfaces") are becoming increasingly popular because of their ease and versatility of operation as well as to their declining price. Touch surfaces allow a user to make selections and move a cursor by simply touching the surface, which may be a pad or the display screen, with a finger, stylus, or the like. In general, the touch surface recognizes the touch and position of the touch and the computer system interprets the touch and thereafter performs an action based on the touch.

Of particular interest are touch screens. Various types of touch screens are described in applicant's co-pending patent application Ser. No. 10/840,862, entitled "Multipoint Touchscreen," filed May 6, 2004, which is hereby incorporated by reference in its entirety. As noted therein, touch screens typically include a touch panel, a controller and a software driver. The touch panel is generally a clear panel with a touch sensitive surface. The touch panel is positioned in front of a display screen so that the touch sensitive surface covers the viewable area of the display screen. The touch panel registers touch events and sends these signals to the controller. The controller processes these signals and sends the data to the computer system. The software driver translates the touch events into computer events.

There are several types of touch screen technologies including resistive, capacitive, infrared, surface acoustic wave, electromagnetic, near field imaging, etc. Each of these devices has advantages and disadvantages that are taken into account when designing or configuring a touch screen. One problem found in these prior art technologies is that they are only capable of reporting a single point even when multiple objects are placed on the sensing surface. That is, they lack the ability to track multiple points of contact simultaneously. In resistive and traditional capacitive technologies, an average of all simultaneously occurring touch points are determined and a single point which falls somewhere between the touch points is reported. In surface wave and infrared technologies, it is impossible to discern the exact position of multiple touch points that fall on the same horizontal or vertical lines due to masking. In either case, faulty results are generated.

These problems are particularly problematic in handheld devices, such as tablet PCs, where one hand is used to hold the tablet and the other is used to generate touch events. For example, as shown in FIGS. 1A and 1B, holding a tablet 2 causes the thumb 3 to overlap the edge of the touch sensitive surface 4 of the touch screen 5. As shown in FIG. 1A, if the touch technology uses averaging, the technique used by resistive and capacitive panels, then a single point that falls somewhere between the thumb 3 of the left hand and the index finger 6 of the right hand would be reported. As shown in FIG. 1B, if the technology uses projection scanning, the technique used by infrared and surface acoustic wave panels, it is hard to discern the exact vertical position of the index finger 6 due to the large vertical component of the thumb 3. The tablet 2 can only resolve the patches shown in gray. In essence, the thumb 3 masks out the vertical position of the index finger 6.

While virtually all commercially available touch screen based systems available today provide single point detection only and have limited resolution and speed, other products available today are able to detect multiple touch points. Unfortunately, these products only work on opaque surfaces because of the circuitry that must be placed behind the electrode structure. Examples of such products include the Fingerworks series of touch pad products. Historically, the number of points detectable with such technology has been limited by the size of the detection circuitry.

Therefore, what is needed in the art is a multi-touch capable touch screen controller that facilitates the use of transparent touch sensors and provides for a conveniently integrated package.

SUMMARY

A controller for multi-touch touch surfaces is disclosed herein. One aspect of the multi-touch touch surface controller relates to the integration of drive electronics for stimulating the multi-touch sensor and sensing circuits for reading the multi-touch sensor into a single integrated package.

Another aspect of the controller relates to a technique for suppressing noise in the sensor by providing a plurality of stimulus waveforms to the sensor wherein the waveforms have different frequencies. This permits at least one noise-free detection cycle in cases where noise appears at a particular frequency.

Another aspect of the controller relates to a charge amplifier that includes programmable components, namely, programmable resistors and capacitors to allow the circuit to be easily reconfigured to provide optimum sensing configurations for a variety of sensor conditions.

Another aspect of the controller relates to an offset compensation circuit that expands the dynamic range of the controller by eliminating a static portion of the multi-touch surface sensor output allowing the full dynamic range of the sensing circuitry to be allocated to the changing portions of the output signal.

Another aspect of the controller relates to a demodulation circuit that enhances the noise immunity of the sensor arrangement by application of particular demodulation waveforms known to have particular frequency characteristics.

Another aspect of the controller relates to the application of various algorithms to the sensor outputs obtained from the multiple stimulus frequencies described above to further increase noise immunity of the system.

These and other aspects will be more readily understood by reference to the following detailed description and figures.

DETAILED DESCRIPTION OF THE INVENTION

A multipoint touch screen controller (MTC) is described herein. The following embodiments of the invention, described in terms of devices and applications compatible with computer systems manufactured by Apple Computer, Inc. of Cupertino, Calif., are illustrative only and should not be considered limiting in any respect.

Figure 1A:
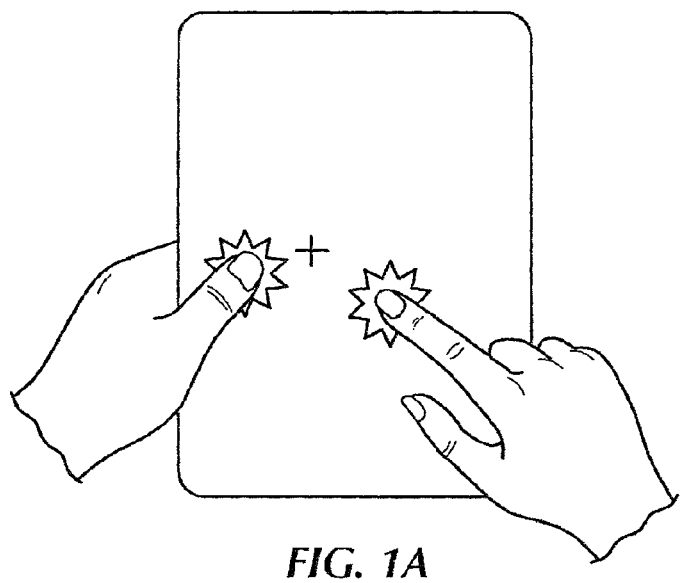
FIGS. 1A and 1B illustrates certain problems with prior art touch screen technologies.
Figure 1B:
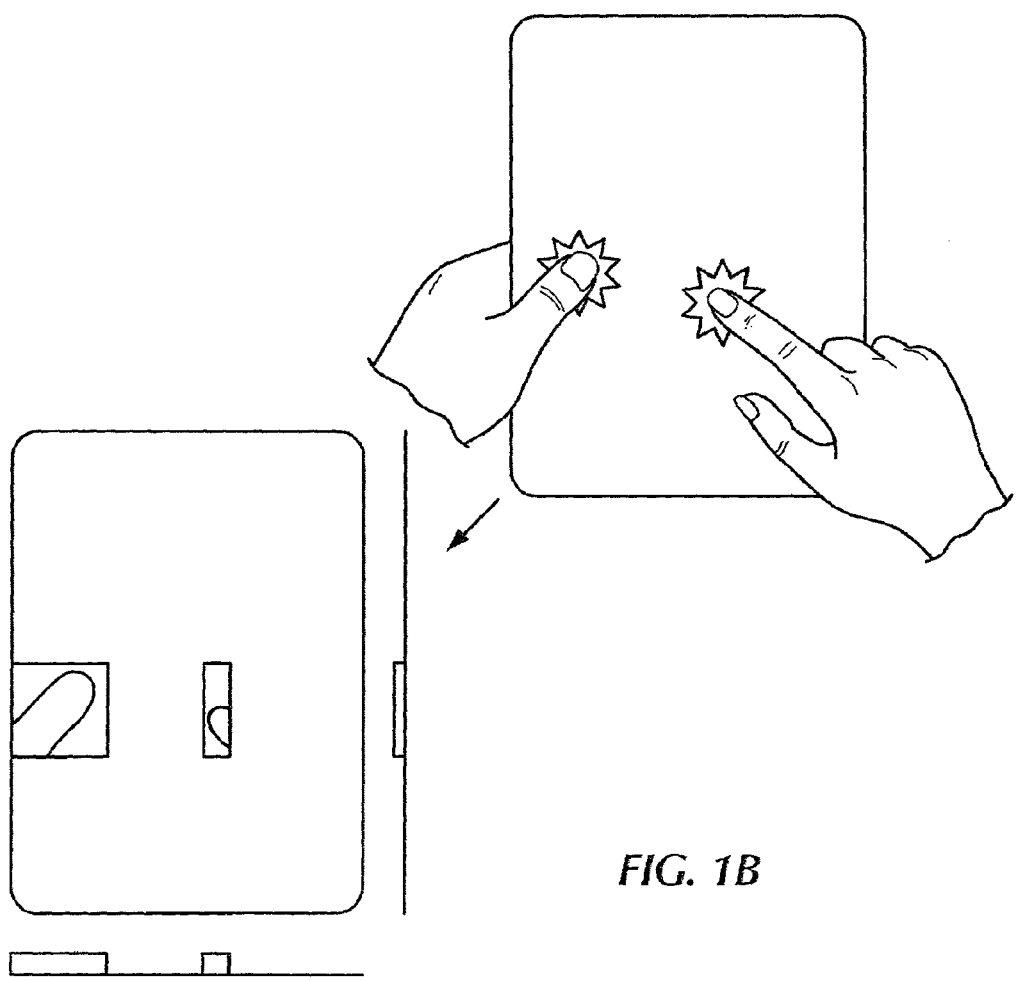
Figure 2:
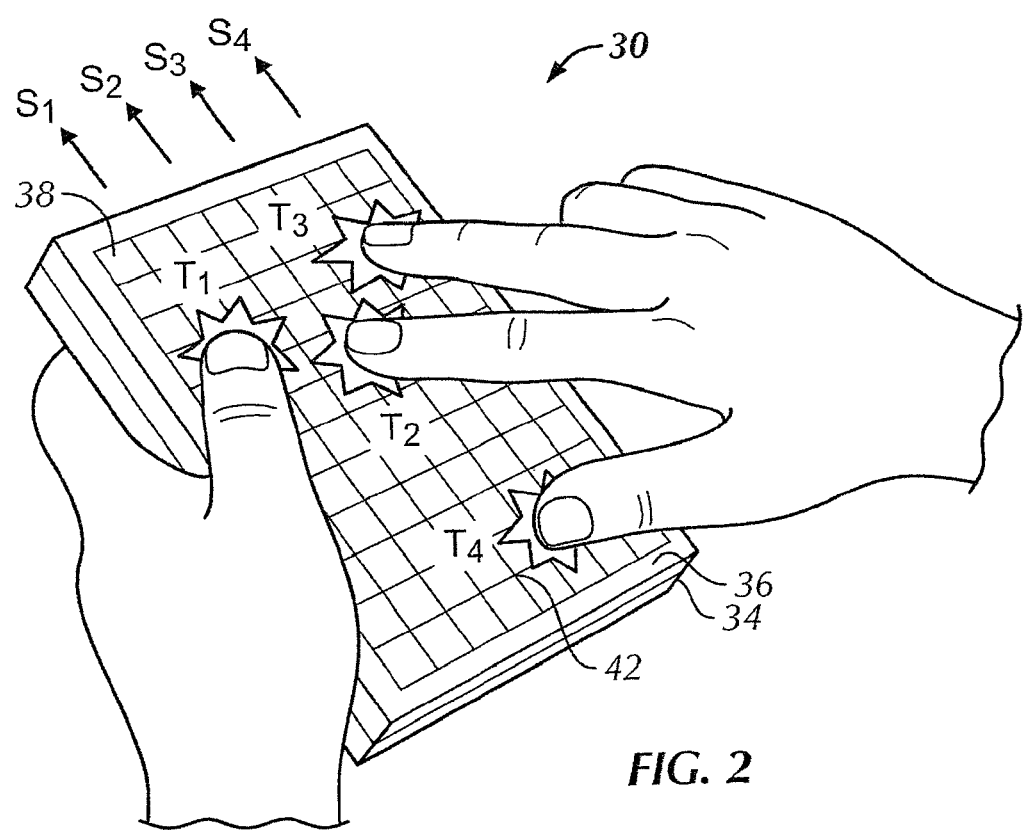
FIG. 2 illustrates a perspective view of a computing device incorporating a multi-touch touch screen and multi-touch touch screen controller according to certain teachings of the present disclosure.

FIG. 2 is a perspective view of a touch screen display arrangement 30. Display arrangement 30 includes a display 34 and a transparent touch screen 36 positioned in front of display 34. Display 34 may be configured to display a graphical user interface (GUI) including perhaps a pointer or cursor as well as other information to the user. Transparent touch screen 36 is an input device that is sensitive to a user's touch, allowing a user to interact with the graphical user interface on display 34. In general, touch screen 36 recognizes touch events on surface 38 of touch screen 36 and thereafter outputs this information to a host device. The host device may, for example, correspond to a computer such as a desktop, laptop, handheld or tablet computer. The host device interprets the touch event and thereafter performs an action based on the touch event.

In contrast to prior art touch screens, touch screen 36 shown herein is configured to recognize multiple touch events that occur simultaneously at different locations on touch sensitive surface 38. That is, touch screen 36 allows for multiple contact points T1-T4 to be tracked simultaneously. Touch screen 36 generates separate tracking signals S1-S4 for each touch point T1-T4 that occurs on the surface of touch screen 36 at the same time. In one embodiment, the number of recognizable touches may be about 15 which allows for a user's 10 fingers and two palms to be tracked along with 3 other contacts. The multiple touch events can be used separately or together to perform singular or multiple actions in the host device. Numerous examples of multiple touch events used to control a host device are disclosed in U.S. Pat. Nos. 6,323,846; 6,888,536; 6,677,932; 6,570,557, and co-pending U.S. patent application Ser. Nos. 11/015,434; 10/903,964; 11/048,264; 11/038,590; 11/228,758; 11/228,700; 11/228,737; 11/367,749, each of which is hereby incorporated by reference in its entirely.

Figure 3:
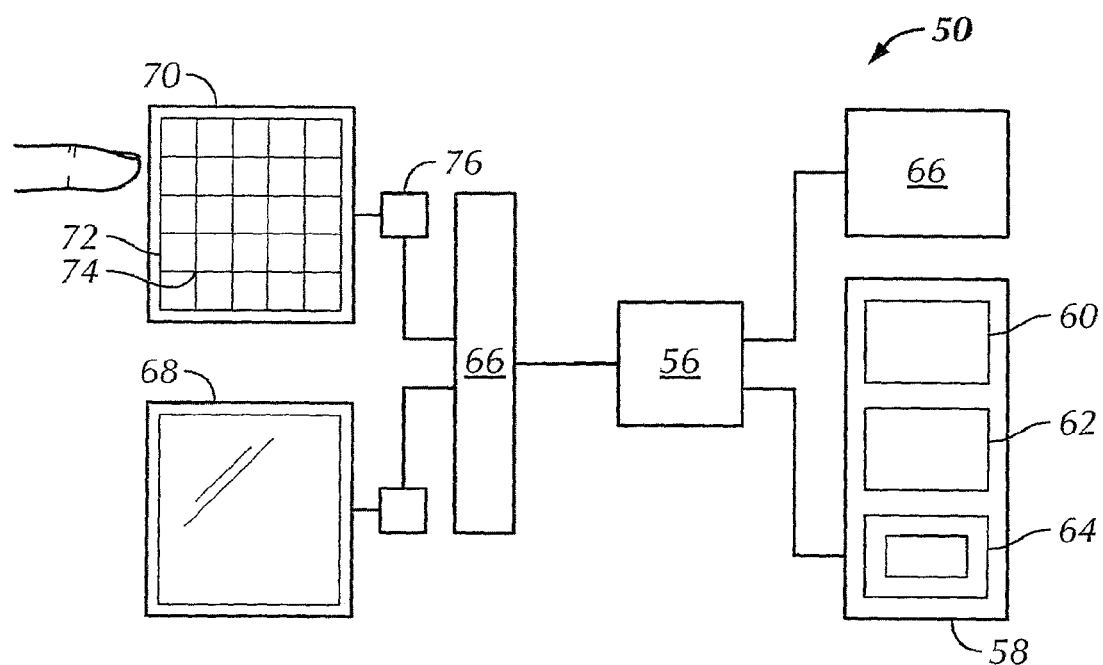
FIG. 3 is a block diagram of a computing device incorporating a multi-touch touch screen and multi-touch touch screen controller according to certain teachings of the present disclosure.

FIG. 3 is a block diagram of a computer system 50, employing a multi-touch touch screen. Computer system 50 may be, for example, a personal computer system such as a desktop, laptop, tablet, or handheld computer. The computer system could also be a public computer system such as an information kiosk, automated teller machine (ATM), point of sale machine (POS), industrial machine, gaming machine, arcade machine, vending machine, airline e-ticket terminal, restaurant reservation terminal, customer service station, library terminal, learning device, etc.

Computer system 50 includes a processor 56 configured to execute instructions and to carry out operations associated with the computer system 50. Computer code and data required by processor 56 are generally stored in storage block 58, which is operatively coupled to processor 56. Storage block 58 may include read-only memory (ROM) 60, random access memory (RAM) 62, hard disk drive 64, and/or removable storage media such as CD-ROM, PC-card, floppy disks, and magnetic tapes. Any of these storage devices may also be accessed over a network. Computer system 50 also includes a display device 68 that is operatively coupled to the processor 56. Display device 68 may be any of a variety of display types including liquid crystal displays (e.g., active matrix, passive matrix, etc.), cathode ray tubes (CRT), plasma displays, etc.

Computer system 50 also includes touch screen 70, which is operatively coupled to the processor 56 by I/O controller 66 and touch screen controller 76. (The I/O controller 66 may be integrated with the processor 56, or it may be a separate component.) In any case, touch screen 70 is a transparent panel that is positioned in front of the display device 68, and may be integrated with the display device 68 or it may be a separate component. Touch screen 70 is configured to receive input from a user's touch and to send this information to the processor 56. In most cases, touch screen 70 recognizes touches and the position and magnitude of touches on its surface.

Figure 5:
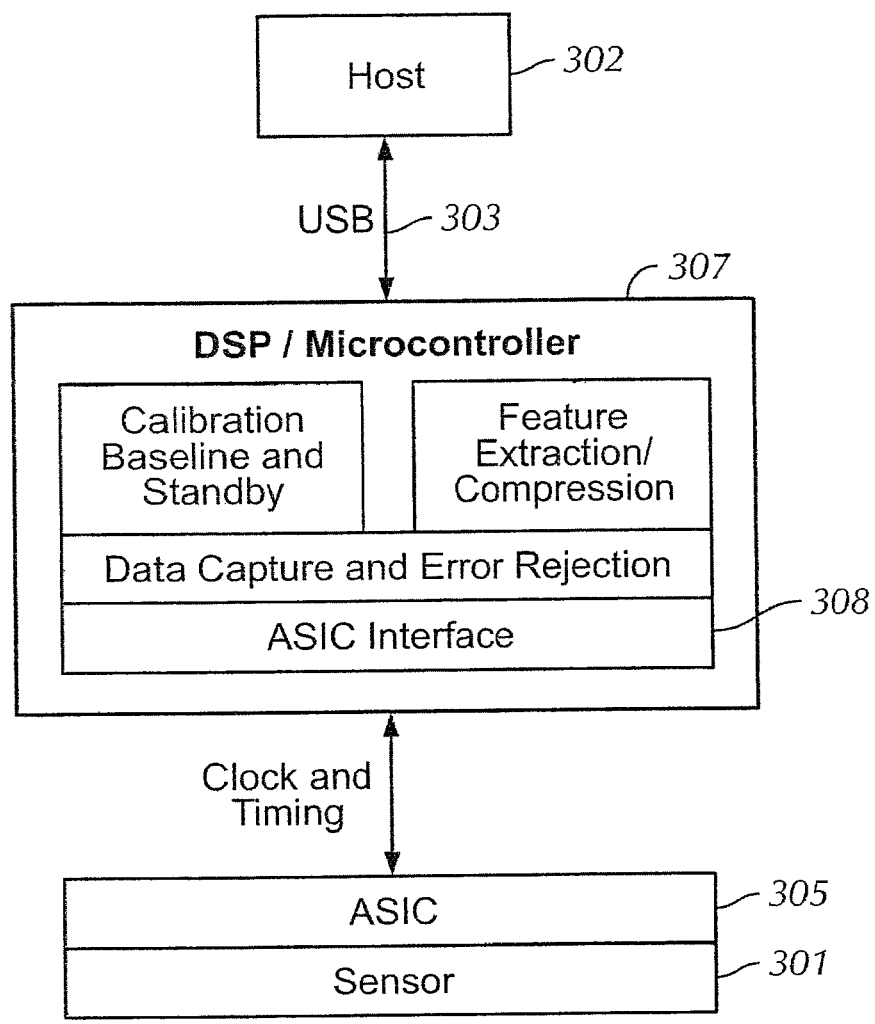
FIG. 5 is a layer diagram illustrating communication between the multi-touch surface and the host computer device by way of a multi-touch controller incorporating various teachings of the present disclosure.

Better understanding of the interface between the touch sensor and the host computer system may be had with reference to FIG. 5, which is a layer diagram of the system illustrated in FIG. 3. The touch sensor 301 resides at the lower-most layer. In a preferred embodiment, the sensor interfaces with an ASIC (application specific integrated circuit) 305 that stimulates the sensor and reads the raw sensor output as described in more detail below. ASIC 305 interfaces via signaling 306 with a DSP (digital signal processor) and/or microcontroller 307, which generates the capacitance images. Together ASIC 305 and DSP/microcontroller 307 form the multipoint touch screen controller.

DSP/Microcontroller 307 includes an interface 308 for accepting the signaling 306 from ASIC 305, and these signals are then passed to a data capture and error rejection layer 309. Data from this layer may be accessed both for calibration, baseline and standby processing by module 310, as well as feature (i.e., touch point) extraction and compression module 311. Once the features are extracted they are passed as high-level information to the host computer 302 via interface 303. Interface 303 may be, for example, a USB (universal serial bus) interface. Alternatively, other forms of interface, such as IEEE 1394 ("Firewire"), RS-232 serial interface, SCSI (small computer systems interface), etc. could be used.

Figure 4A:
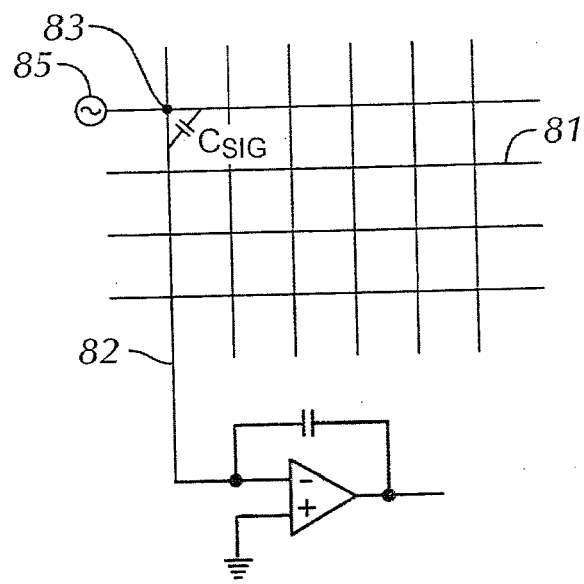
FIGS. 4A and 4B illustrate two possible arrangement of drive and sense electrodes in a multi-touch touch surface.
Figure 4B:
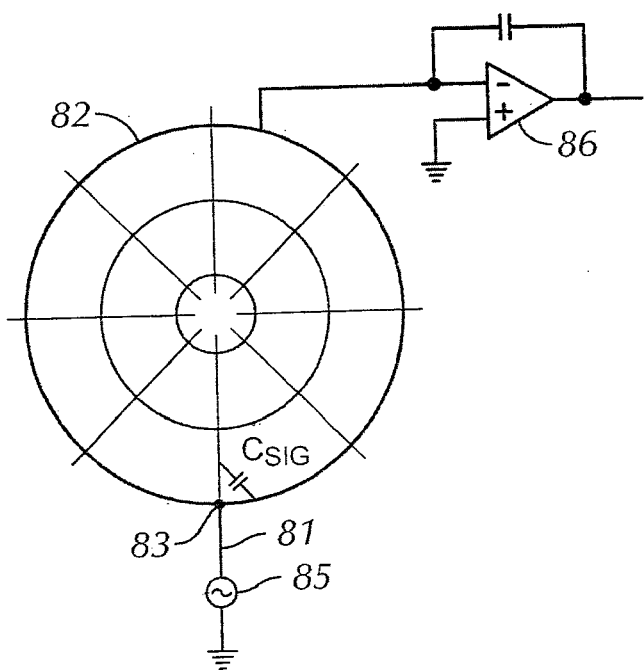

The exact physical construction of the sensing device is not necessary for a complete understanding touch screen controller disclosed herein. Nonetheless, details of the construction may be understood by reference to the patents and patent applications incorporated by reference above. For purposes of the present description, the sensor may be assumed to be a mutual capacitance device constructed as described below with reference to FIGS. 4A and 4B.

The sensor panel is comprised of a two-layered electrode structure, with driving lines on one layer and sensing lines on the other. In either case, the layers are separated by a dielectric material. In the Cartesian arrangement of FIG. 4A, one layer is comprised of N horizontal, preferably equally spaced row electrodes 81, while the other layer is comprised of M vertical, preferably equally spaced column electrodes 82. In a polar arrangement, illustrated in FIG. 4B, the sensing lines may be concentric circles and the driving lines may be radially extending lines (or vice versa). As will be appreciated by those skilled in the art, other configurations based on an infinite variety of coordinate systems are also possible.

Each intersection 83 represents a pixel and has a characteristic mutual capacitance, $C_{SIG}$. A grounded object (such as a finger) that approaches a pixel 83 from a finite distance shunts the electric field between the row and column intersection, causing a decrease in the mutual capacitance $C_{SIG}$ at that location. In the case of a typical sensor panel, the typical signal capacitance $C_{SIG}$ is about 0.75 pF and the change induced by a finger touching a pixel, is about 0.25 pF.

The electrode material may vary depending on the application. In touch screen applications, the electrode material may be ITO (Indium Tin Oxide) on a glass substrate. In a touch tablet, which need not be transparent, copper on an FR4 substrate may be used. The number of sensing points 83 may also be widely varied. In touch screen applications, the number of sensing points 83 generally depends on the desired sensitivity as well as the desired transparency of the touch screen 70. More nodes or sensing points generally increases sensitivity, but reduces transparency (and vice versa).

During operation, each row (or column) is sequentially charged by driving it with a predetermined voltage waveform 85 (discussed in greater detail below). The charge capacitively couples to the columns (or rows) at the intersection. The capacitance of each intersection 83 is measured to determine the positions of multiple objects when they touch the touch surface. Sensing circuitry monitors the charge transferred and time required to detect changes in capacitance that occur at each node. The positions where changes occur and the magnitude of those changes are used to identify and quantify the multiple touch events. Driving each row and column and sensing the charge transfer is the function of a multipoint touch screen controller.

Figure 6:
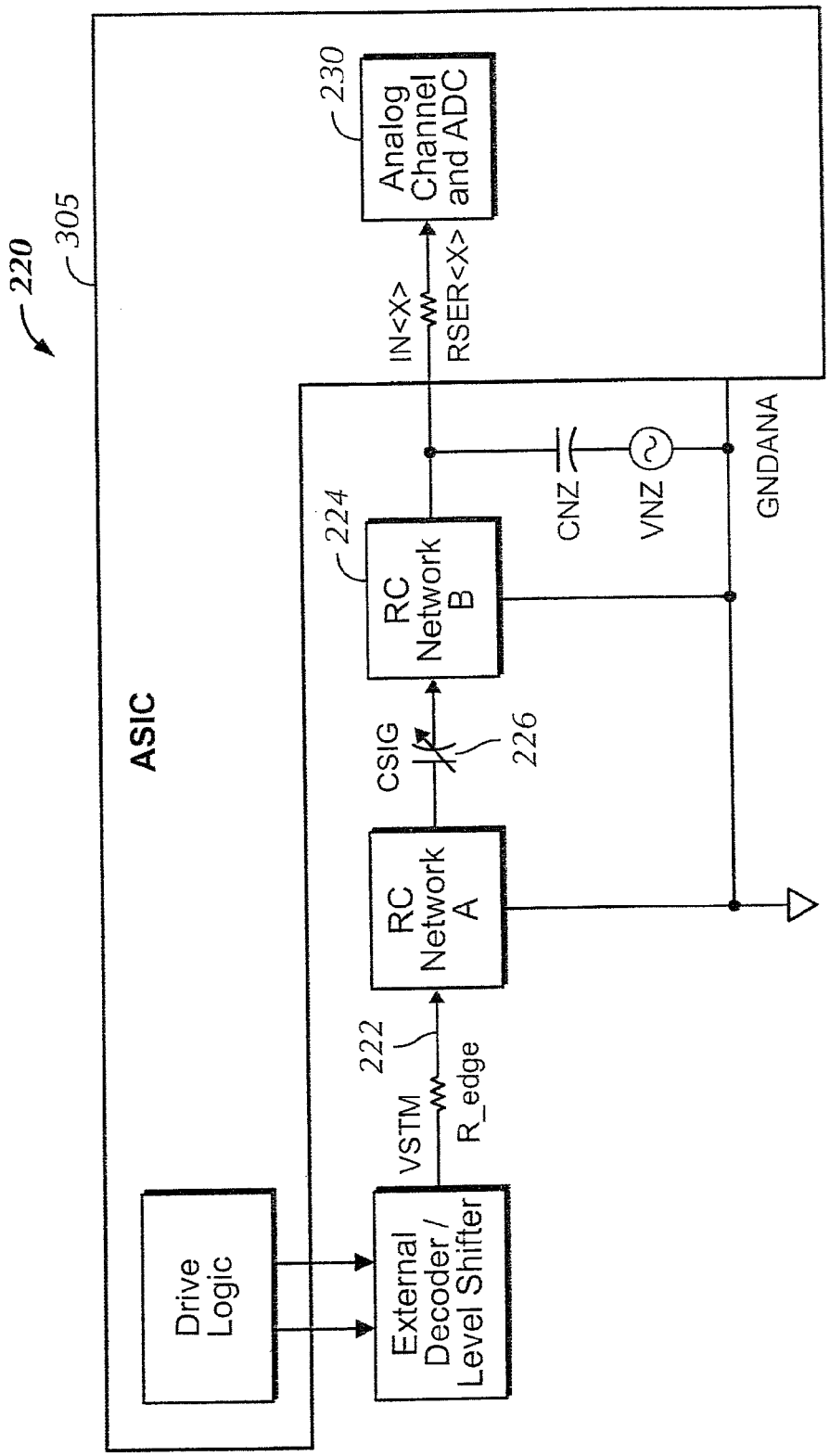
FIG. 6 is an equivalent circuit showing the output circuitry of the controller, a cell of the multi-touch sensor, and the input circuitry of a multi-touch controller incorporating various teachings of the present disclosure.

FIG. 6 is a simplified diagram of the equivalent mutual capacitance circuit 220 for each coupling node. Mutual capacitance circuit 220 includes a driving line 222 and a sensing line 224 that are spatially separated thereby forming a capacitive coupling node 226. When no object is present, the capacitive coupling at node 226 stays fairly constant. When an object, such as a finger, is placed proximate the node 226, the capacitive coupling through node 226 changes. The object effectively shunts the electric field so that the charge transferred across node 226 is less.

Figure 8:
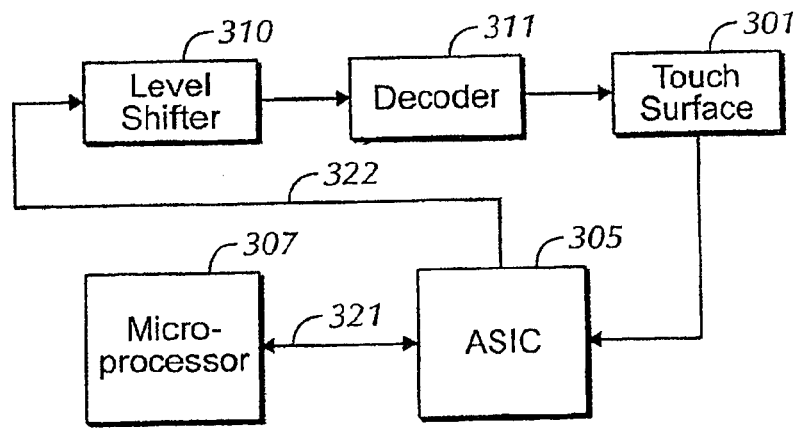
FIG. 8 is a block diagram of the multi-touch surface and multi-touch controller system in accordance with various teachings of the present disclosure.

With reference to FIGS. 5 and 8, ASIC 305 generates all the drive waveforms necessary to scan the sensor panel. Specifically, the microprocessor sends a clock signal 321 to set the timing of the ASIC, which in turn generates the appropriate timing waveforms 322 to create the row stimuli to the sensor 301. Decoder 311 decodes the timing signals to drive each row of sensor 301 in sequence. Level shifter 310 converts timing signals 322 from the signaling level (e.g., 3.3V) to the level used to drive the sensor (e.g., 18V).

Each row of the sensor panel is driven determined by microprocessor 307. For noise rejection purposes it is desirable to drive the panel at multiple different frequencies. Noise that exists at a particular drive frequency may not, and likely will not exist at the other frequencies. In a preferred embodiment, each sensor panel row is stimulated with three bursts of twelve square wave cycles (50% duty-cycle, 18V amplitude), while the remaining rows are kept at ground. For better noise rejection, described in greater detail below the frequency of each burst is different, exemplary burst frequencies are 140 kHz, 200 kHz, and 260 Khz.

During each burst of pulses ASIC 305 takes a measurement of the column electrodes. This process is repeated for all remaining rows in the sensor panel. The results are three images, each image taken at a different stimulus frequency.

Additionally, it is preferable to minimize the amount of stimulus frequency change required for each subsequent burst. Therefore a frequency hopping pattern that minimizes the changes is desirable. FIG. 29 shows one possible frequency hopping pattern. In this arrangement, a first row is driven with a 140 kHz burst, then a 200 kHz, and finally a 260 kHz burst. Then a next row is driven with three bursts at 260 kHz, 200 kHz, and 140 kHz, respectively. This particular frequency pattern was chosen to keep changes between frequencies small and allow the frequency transitions have to be smooth and glitch free. However, other frequency hopping arrangements are also possible, including scanning more than three frequencies, scanning the frequencies in a quasi-random sequence rather than the ordered pattern described, and adaptive frequency hopping, in which the scan frequencies are selected based on the noise environment.

Turning back to FIG. 6, sensing line 224 is electrically coupled to a capacitive sensing circuit 230. Capacitive sensing circuit 230 detects and quantifies the current change and the position of the node 226 where the current change occurred and reports this information to a host computer. The signal of interest is the capacitance $C_{SIG}$, which couples charge from RC network A to RC network B. The output from RC network B connects directly to the analog input terminals of ASIC 305. ASIC 305 also uses the clock signal 321 (FIG. 8) from microprocessor 307 (FIG. 8) to time the detection and quantification of the capacitance signals.

Figure 7:
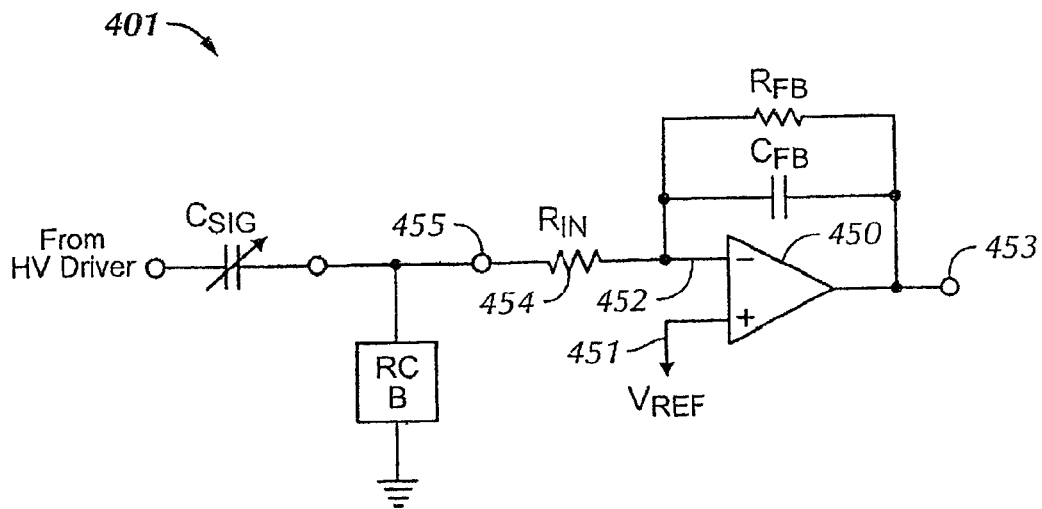
FIG. 7 is a circuit schematic of a charge amplifier incorporated in certain embodiments of a multi-touch controller incorporating various teachings of the present disclosure.
Figure 10:
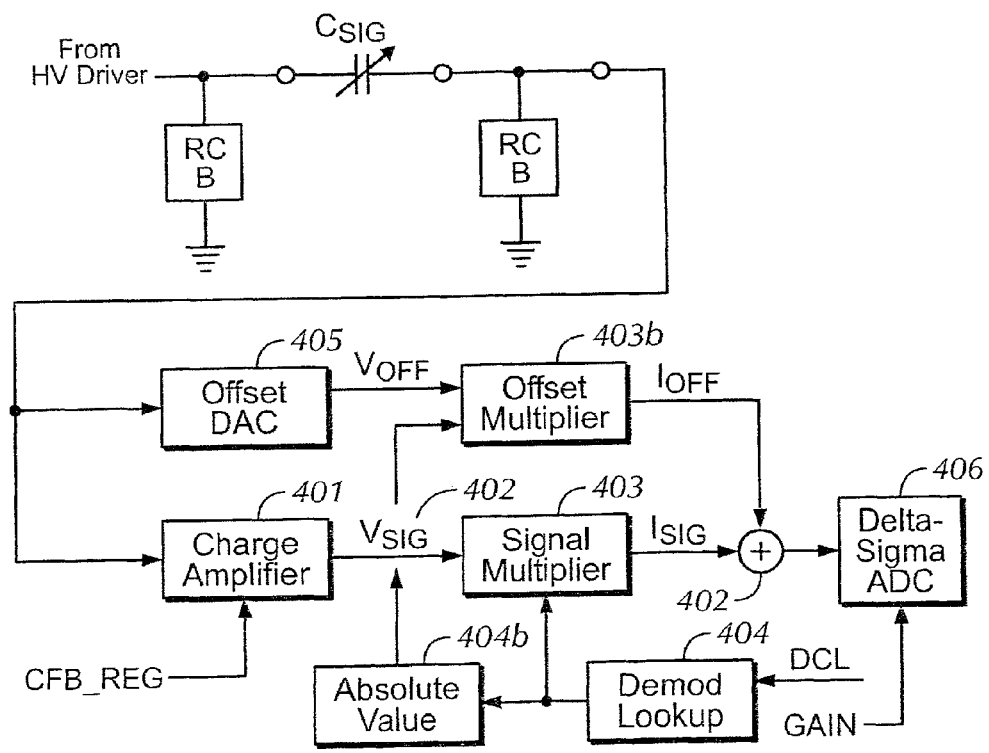
FIG. 10 is a block diagram illustrating the input circuitry of a multi-touch controller incorporating certain teachings of the present disclosure.

FIG. 10 is a block diagram illustrating the input stage of ASIC 305. The input signal is first received by a charge amplifier 401. The charge amplifier performs the following tasks: (1) charge to voltage conversion, (2) charge amplification, (3) rejection or stray capacitance present at the column electrode, and (4) anti aliasing, and (5) gain equalization at different frequencies. FIG. 7 is a diagram of one possible charge amplifier 401.

Charge to voltage conversion is performed by a capacitor $C_{FB}$ in the feedback path of an operational amplifier 450. In one embodiment, the feedback capacitor can be programmed with values ranging from 2 to 32 pF, which allows the output voltage level to be adjusted to obtain the best dynamic range for a range of $C_{SIG}$ values. The feedback resistor $R_{FB}$ is also preferably programmable to control the amplifier gain.

Because $C_{SIG}$ will vary across a touch surface because of a variety of manufacturing tolerance related factors, it is useful to adjust the charge amplifier feedback capacitance $C_{FB}$ on a per-pixel basis. This allows gain compensation to be performed to optimize the performance of each pixel. In one embodiment, quasi-per pixel adjustment is performed as follows: The feedback capacitor $C_{FB}$ has its value set by a register known as CFB_REG. The value of CFB_REG is set according to the following equation:

$$CFB\_REG[Y]=CFB\_UNIV+CFB[Y]$$

where Y is an individual pixel within a row, CFB_UNIV is adjusted on a row by row basis, and CFB[Y] is a lookup table loaded at system startup. In alternative arrangements, CFB_UNIV may be constant for all rows, or the CFB[Y] lookup table may be switched out on a row by row basis. Also, although discussed in terms of rows and columns, the adjustment arrangement is equally applicable to non-Cartesian coordinate systems.

Obviously it is desirable to measure $C_{SIG}$ while rejecting as much as possible the effects of any parasitic resistance and capacitance in the physical sensor. Rejection of parasitic resistance and capacitance in the sensor may be accomplished by holding the non-inverting input 451 of amplifier 45D at a constant value, e.g., ground. The inverting input 452 is coupled to the node being measured. As will be appreciated by those skilled in the art, inverting input 452 (connected to the column electrode being measured) is thus held at virtual ground. Therefore any parasitic capacitance present at the column electrode, e.g., PCB stray capacitance or dynamic stray capacitance caused by the user touching the column electrode, is rejected because the net charge of the stray capacitor does not change (i.e., the voltage across the stray capacitance is held at virtual ground). Therefore the charge amplifier output voltage 453 is only a function of the stimulus voltage, $C_{SIG}$, and $C_{FB}$. Because the stimulus voltage and $C_{FB}$ are determined by the controller, $C_{SIG}$ may be readily inferred.

A series resistor 454 between the ASIC input pin 455 and the inverting input 452 of the charge amplifier forms an anti-aliasing filter in combination with the feedback network of $R_{FB}$ and $C_{FB}$.

The high pass roll off of the charge amplifier is set by the parallel combination of the feedback resistor $R_{FB}$ and the feedback capacitor $C_{FB}$.

Again with reference to FIG. 10, the output of charge amplifier 401 passes to demodulator 403. Demodulator 403 is a 5-bit quantized continuous time analog (four-quadrant) multiplier. The purpose of demodulator 403 is to reject out of band noise sources (from cell phones, microwave ovens, etc.) that are present on the signal entering ASIC 305. The output 402 of the charge amplifier ($V_{SIG}$) is mixed with a 5-bit quantized waveform that is stored in a lookup table 404. The shape, amplitude, and frequency of the demodulation waveform is determined by programming suitable coefficients into lookup table 404. The demodulation waveform determines pass band, stop band, stop band ripple and other characteristics of the mixer. In a preferred embodiment, Gaussian shaped sine wave is used as the demodulation waveform. A Gaussian sine wave provides a sharp pass band with reduced stop band ripple.

Another aspect of demodulator 403 relates to demodulator phase delay adjustment. As can be seen with reference to FIG. 10, the touch surface electrodes can be represented by a RC networks (RC Network A and RC Network B) that have a mutual capacitance ($C_{SIG}$) at the point they intersect. Each RC network constitutes a low pass filter, while $C_{SIG}$ introduces a high pass filter response. Therefore the touch panel looks like a bandpass filter, only allowing signals with a certain frequency ranges to pass the panel. This frequency range, i.e., those frequencies that are below the cutoff of $C_{SIG}$ but above the cutoff of RC Networks A and B, determines the stimulus frequencies that may be used to drive the touch panel.

The panel will therefore impose a phase delay on the stimulus waveform passing through it. This phase delay is negligible for traditional opaque touch panels, wherein the electrode structure is typically formed by PCB traces, which have negligible resistance to their characteristic impedance. However, for transparent panels, typically constructed using Indium Tin Oxide (ITO) conductive traces, the resistive component may be quite large. This introduces a significant time (phase) delay in the propagation of the stimulus voltage through the panel. This phase delay causes the demodulation waveform to be delayed with respect to the signal entering the pre-amplifier, thereby reducing the dynamic range of the signal coming out of the ADC.

To compensate for this phase delay, a delay clock register ("DCL", not shown) may be provided, which can be used to delay the demodulation waveform relative to the signal entering the preamplifier therefore compensating for the external panel delay and maximizing the dynamic range. This register is input into the demodulator 403 and simply delays the demodulation waveform by a predetermined amount. The amount may be determined either on startup of the panel by measurement, or may be estimated for the panel as a whole based on known manufacturing characteristics. Each pixel of the touch surface may have its own uniquely determined delay parameter to fully optimize the reading circuitry, or the delay parameter may be determined on a row by row basis. Adjustment would be generally similar to the techniques discussed above for adjustment of the charge amplifier feedback capacitor and the offset compensation voltage.

The demodulated signal is then passed to offset compensation circuitry. The offset compensation circuitry comprises mixer 402 and programmable offset DAC 405. Mixer 402 takes the output voltage 453 of the demodulator and subtracts an offset voltage (discussed below) to increase the dynamic range of the system.

Offset compensation is necessary because the pixel capacitance $C_{SIG}$ is comprised of a static part and a dynamic part. The static part is a function of sensor construction. The dynamic part is a function of the change of $C_{SIG}$ when the finger approaches the pixel, and is thus the signal of interest. The purpose of the offset compensator is to eliminate or minimize the static component thereby extending the dynamic range of the system.

As noted above, the offset compensation circuitry is comprised of two parts, a programmable offset DAC 405 and a mixer 402. Offset DAC 405 generates a programmable offset voltage from the digital static offset value VOFF_REG. This digital value is converted into a static analog voltage (or current, if operating in the current domain) by the DAC and then mixed (by mixer 403*b*) with a voltage (or current) set by the absolute value (determined by block 404*b*) of the demodulation waveform. The result is a rectified version of the demodulation waveform, the amplitude of which is set by the static value of VOFF_REG and the absolute portion of the demodulation waveform currently retrieved from the DMOD lookup table 404. This allows for the right amount of offset compensation for a given portion of the demodulation waveform. Therefore the offset compensation waveform effectively tracks the demodulation waveform.

As with the charge amplifier feedback capacitor, it is useful to adjust the offset compensation circuitry to account for variations in the individual pixel capacitance due to manufacturing tolerances, etc. The adjustment may be substantially similar to that discussed above with respect to the charge amplifier feedback capacitor. Specifically, the offset voltage value stored in VOFF_REG may be calculated as follows:

$$\text{VOFF\_REG}[Y] = \text{VOFF\_UNIV} + \text{VOFF}[Y]$$

where Y is the individual column within a row, VOFF_UNIV is an offset voltage set on a row by row basis, and VOFF[Y] is a lookup table. Again, the adjustment could be performed on a true pixel by pixel basis or VOFF_UNIV could be a single constant value, depending on a particular implementation. Also, although discussed in terms of rows and columns, the adjustment arrangement is equally applicable to non-Cartesian coordinate systems.

As an alternative to the arrangement described above with respect to FIG. 10, the offset compensation could take place prior to demodulation. In this case, the shape of the offset compensation waveform has to match the waveform coming out of the preamplifier rather than the waveform coming out of the demodulator, i.e., it has to be a square wave, assuming negligible attenuation in the panel, such that the shape of the drive waveform is preserved. Also, if offset compensation is performed first, the offset waveform is an AC waveform with respect to the reference voltage, i.e., the maxima are positive in respect to $V_{REF}$ and the minima are negative in respect to $V_{REF}$. The amplitude of the offset waveform is equivalent to the amount of offset compensation. Conversely, if demodulation is performed first, the offset waveform is a DC waveform, i.e. it is either positive in respect to Vref or negative (since the demodulated waveform is also DC in respect to Vref). Again, the amplitude in this case is equivalent to the amount of offset compensation for every part of the demodulated waveform. In essence, the offset compensation circuit needs to correlate the amount of offset compensation needed dependent on the shape of the waveform.

The demodulated, offset compensated signal is then processed by programmable gain ADC 406. In one embodiment, ADC 406 may be a sigma-delta, although similar type ADCs (such as a voltage to frequency converter with a subsequent counter stage) could be used. The ADC performs two functions: (1) it converts the offset compensated waveform out of the mixer arrangement (offset and signal mixer) to a digital value; and (2) it performs low pass filtering functions, i.e., it averages the rectified signal coming out of the mixer arrangement. The offset compensated, demodulated signal looks like a rectified Gaussian shaped sine wave, whose amplitude is a function of $C_{FB}$ and $C_{SIG}$. The ADC result returned to the host computer is actually the average of that signal.

One advantage of using a sigma delta ADC is that such ADCs are much more efficient for performing averaging in the digital domain. Additionally, digital gates are a lot smaller than analog low pass filters and sample and hold elements, thus reducing the size of the total ASIC. One skilled in the art will further appreciated other advantages, particularly with regard to power consumption and clock speed.

Alternatively, one could use an ADC separate from the controller ASIC. This would require a multiplexor to share the ADC between multiple channels and a sample and hold circuit for each channel to average and hold the average of the demodulation waveform. This would likely consume so much die area as to be impractical for controllers intended for use with touch surfaces having a large number of pixels. Additionally, to achieve acceptable operation, the external ADC would need to operate very fast, as a large number of pixels must be processed very quickly to provide timely and smooth results in response to a user's input.

As noted above, the sensor is driven at three different frequencies, resulting in three capacitance images, which are used for noise rejection as described below. The three frequencies are chosen such that the pass band at one particular frequency does not overlap with the pass bands at the other frequencies. As noted above, a preferred embodiment uses frequencies of 140 kHz, 200 kHz, and 240 kHz. The demodulation waveform is chosen such that the side bands are suppressed.

Figure 11A:
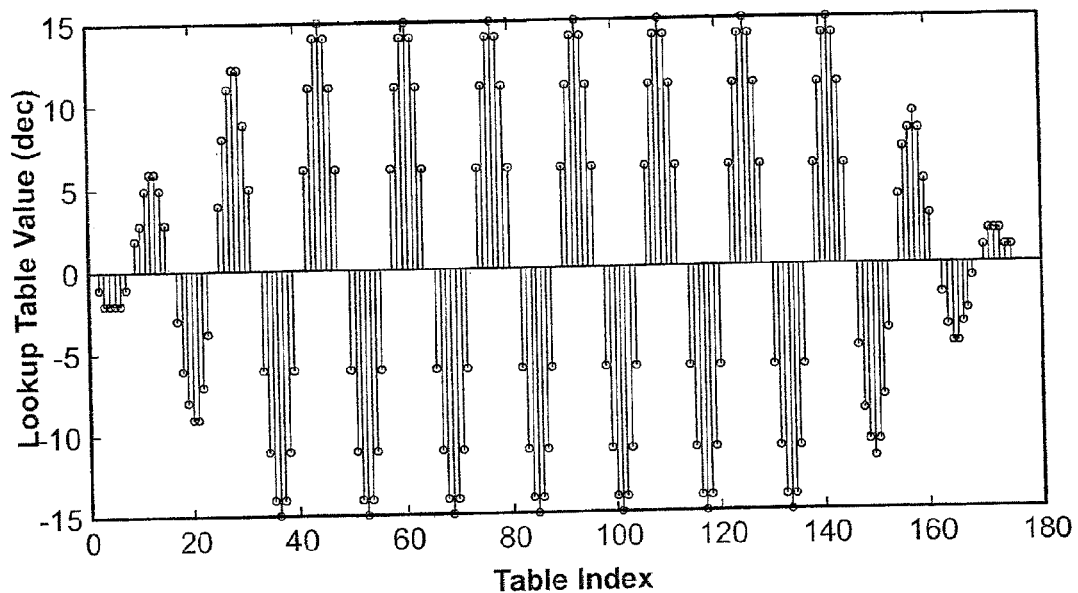
FIGS. 11A and 11B illustrate various demodulation waveforms together with frequency spectra of their passbands.
Figure 11A:
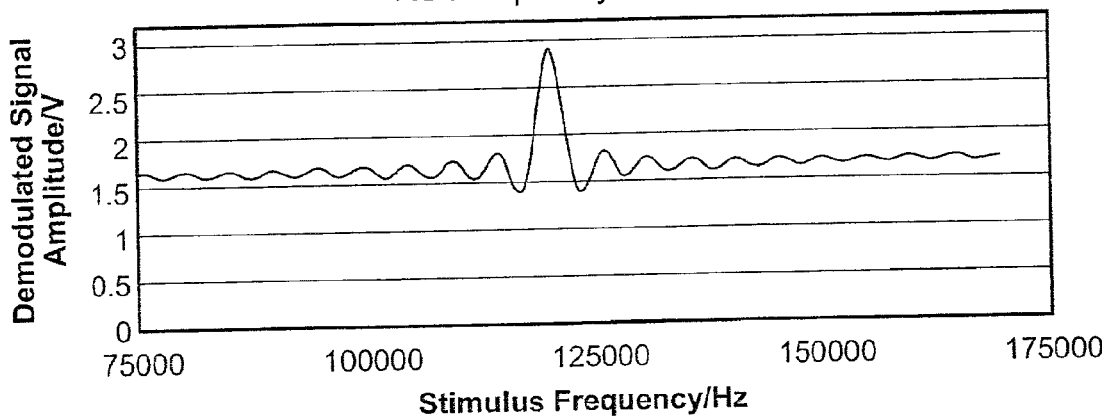
Figure 11B:
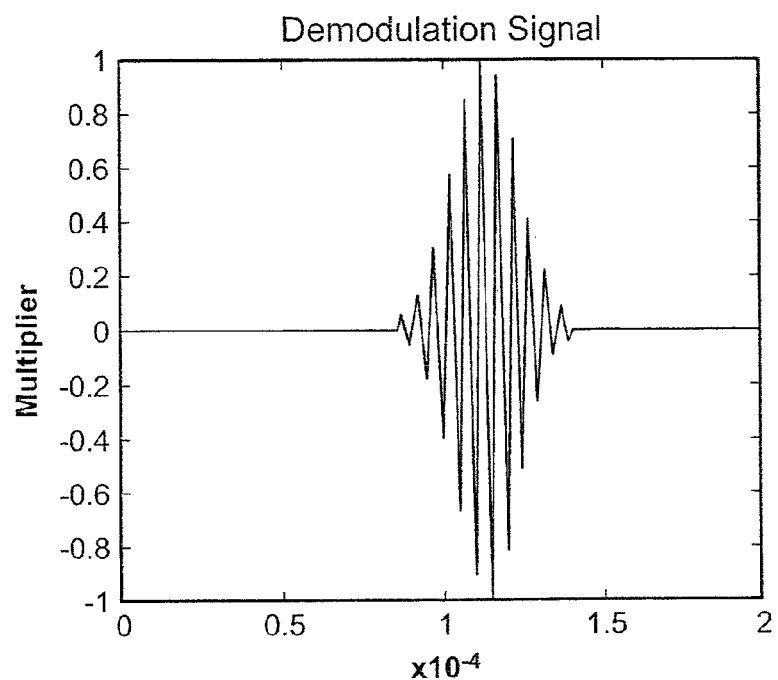
Figure 11B:
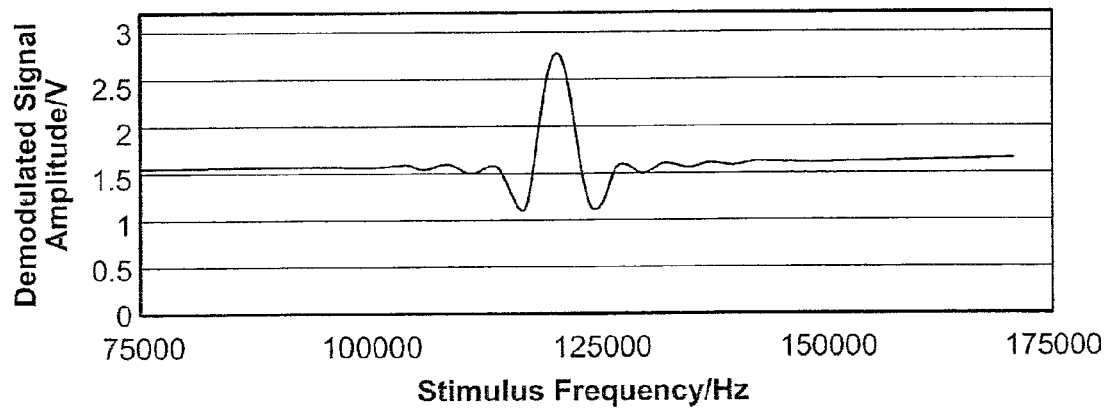

As noted above, a Gaussian enveloped sine wave, illustrated in FIG. 11A together with its passband frequency spectrum, is one preferred demodulation waveform. The Gaussian shaped sine wave provides a well-defined pass band with minimum stop band ripple. Alternatively, other waveforms having well defined pass bands with minimum stop band ripple could also be used. For example, a ramp-enveloped sine wave, illustrated in FIG. 11B together with its passband frequency spectrum, also has a well defined pass band, although the stop band ripple is slightly greater than that for a Gaussian enveloped sine wave. As will be appreciated by those skilled in the art, other waveforms could also be used.

Figure 12:
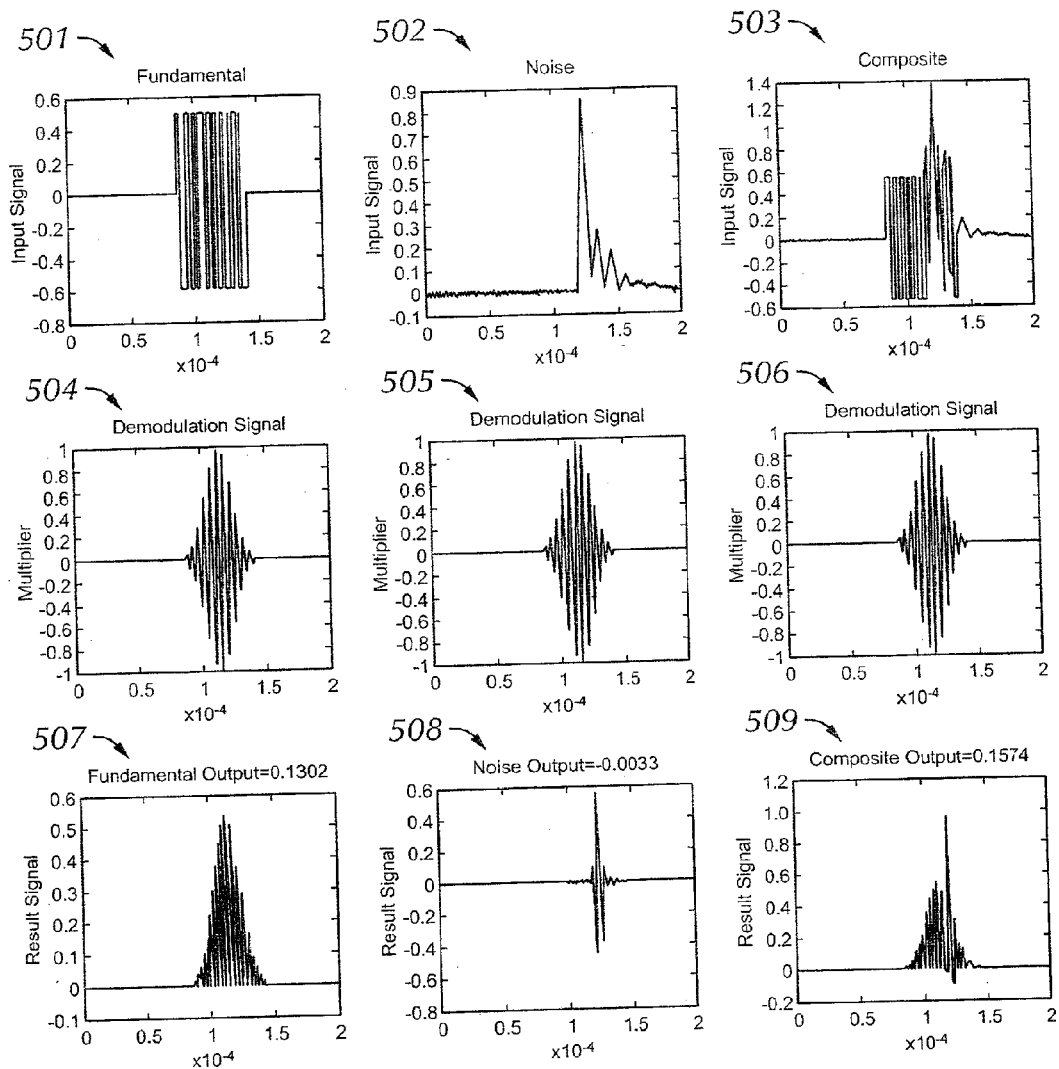
FIG. 12 illustrates a sequence of stimulus waveforms, together with a particular demodulation waveform, and the resulting output.

Turning now to FIG. 12, nine waveforms are illustrated that explain the noise suppression features of the system. Voltage waveform 501 is a square wave demonstrating the stimulus waveform applied to the sensor. Waveform 504 is the Gaussian enveloped sine wave signal used as a demodulation waveform. Waveform 507 is the output of the demodulator, i.e., the product of the waveforms 501 and 504. Note that it provides a well defined pulse at the fundamental frequency of the applied square wave voltage.

The center column illustrates an exemplary noise waveform 502. Demodulation waveform 505 is the same as demodulation waveform 504. Note that the demodulated noise signal 508 does not produce a significant spike, because the fundamental frequency of the noise signal is outside the passband of the demodulation signal.

The composite of the excitation waveform and noise signal is illustrated in 503. Again, demodulation waveform 506 is the same as demodulation waveforms 505 and 504. The demodulated composite does still show the noise waveform, although various signal processing algorithms may be applied to extract this relatively isolated spike.

Figure 13:
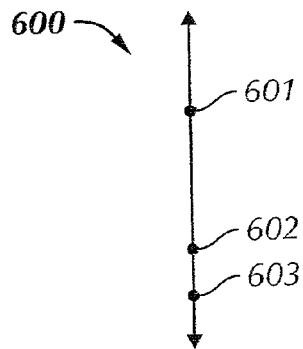
FIG. 13 illustrates the noise rejection technique employed by the majority rules algorithm.

Additionally, noise rejection may accomplished by providing multiple stimulus voltage at different frequencies and applying a majority rules algorithm to the result. In a majority rules algorithm, for each capacitance node, the two frequency channels that provide the best amplitude match are averaged and the remaining channel is disposed of. For example, in FIG. 13 vertical line 600 represents the measured capacitance, with the markings 601, 602, and 603 representing the three values measured at three stimulus frequencies. Values 602 and 603 provide the best match, possibly suggesting that value 601 is corrupted. Thus value 601 is discarded and values 602 and 603 are averaged to form the output.

Alternatively, a median filter could be applied, in which case value 602, i.e., the median value would be selected as an output. As yet another alternative, the three results could simply be averaged, in which case a value somewhere between value 601 and 602 would result. A variety of other noise rejection techniques for multiple sample values will be obvious to those skilled in the art, any of which may suitably be used with the controller described herein.

Figure 14:
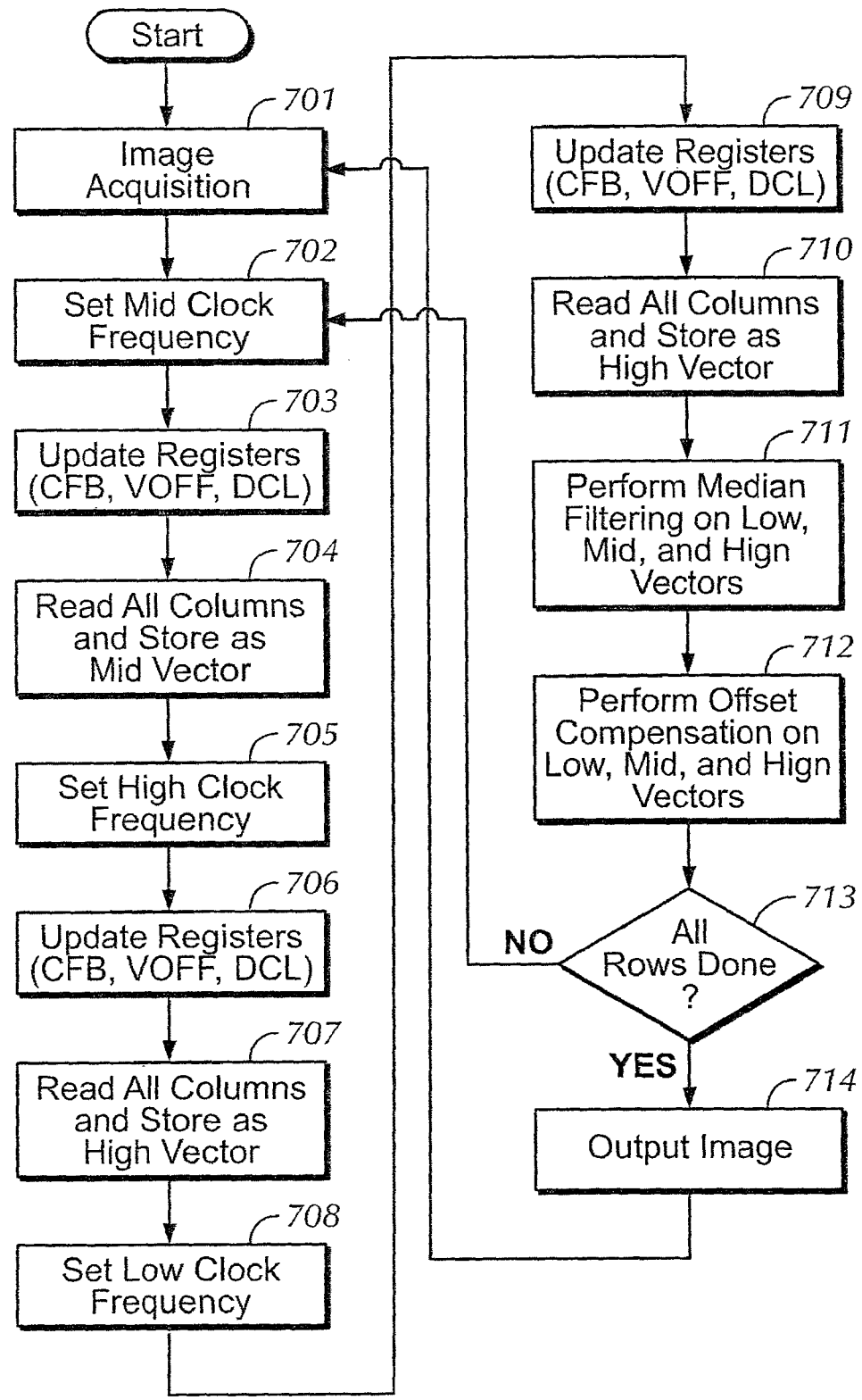
FIG. 14 is a flowchart depicting exemplary steps in the operation of the controller in accordance with various teachings of the present disclosure.

Operation of the circuit may be further understood with respect to FIG. 14, which is a flowchart depicting operation of the controller. One skilled in the art will appreciate that various timing and memory storage issues are omitted from this flowchart for the sake of clarity.

Figure 9:
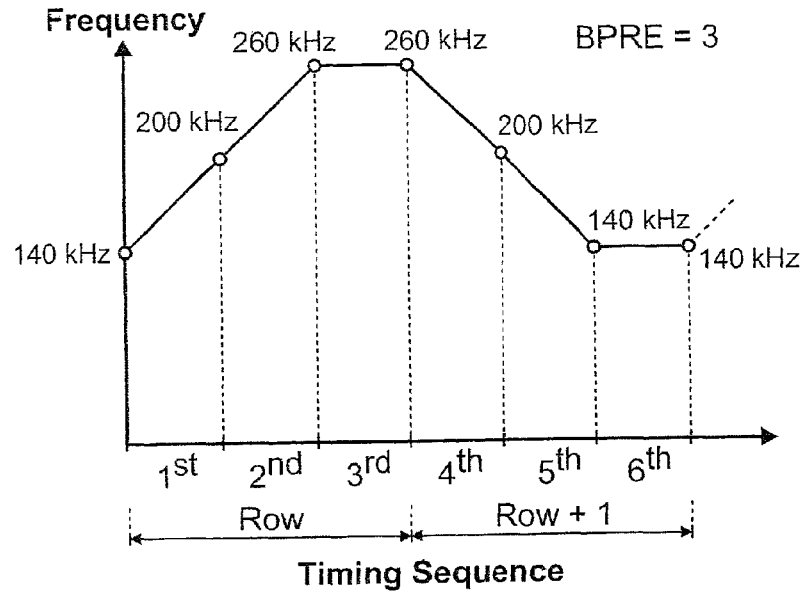
FIG. 9 illustrates the sequence in which drive waveforms of varying frequencies are applied to the multi-touch sensor in accordance with certain teachings of the present disclosure.

Image acquisition begins at block 701. The system then sets the clock so as to acquire samples at the middle clock frequency (e.g., 200 kHz) as discussed above with respect to FIG. 9 (block 702). The various programmable registers, which control such parameters as voltage offset, amplifier gain, delay clocks, etc., are then updated (block 703). All columns are read, with the result stored as a MidVector (block 704) The high clock frequency is then set (block 705), and the steps of updating registers (block 706) and reading all columns and storing the result (step 707) are repeated for the high sample frequency. The clock is then set to the low frequency (step 708) and the register update (block 709) and column reading (block 710) are repeated for the low sample frequency.

The three vectors are then offset compensated, according to the algorithm described above (block 711). The offset compensated vectors are then subjected to a median filter as described above. Alternatively, the offset compensated vectors could be filtered by the majority rules algorithm described with respect to FIG. 13 or any other suitable filtering technique. In any case, the result is stored. If more rows remain, the process returns to the mid frequency sampling at block 702). If all rows are completed (block 713), the entire image is output to the host device (block 714), and a subsequent new image is acquired (block 701).

While this invention has been described in terms of several preferred embodiments, there are alterations, permutations, and equivalents, which fall within the scope of this invention. For example, the term "computer" does not necessarily mean any particular kind of device, combination of hardware and/or software, nor should it be considered restricted to either a multi purpose or single purpose device. Additionally, although the embodiments herein have been described in relation to touch screens, the teachings of the present invention are equally applicable to touch pads or any other touch surface type of sensor. Furthermore, although the disclosure is primarily directed at capacitive sensing, it should be noted that some or all of the features described herein may be applied to other sensing methodologies. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An application specific integrated circuit (ASCI) connected to a touch sensor panel including a plurality of drive electrodes and a plurality of sense electrodes, the ASCI is programmed to scan the touch sensor panel, each scan of the touch sensor panel comprising:
   stimulating a first drive electrode of the plurality of drive electrodes with a first periodic waveform and consecutively a second periodic waveform, wherein the second periodic waveform has a frequency different from a frequency of the first periodic waveform;
   stimulating a second drive electrode of the plurality of drive electrodes with the first periodic waveform and consecutively the second periodic waveform, wherein the second drive electrode is stimulated after the stimulation of the first drive electrode; and
   capturing a capacitance measurement from the plurality of sense electrodes in response to each stimulation of the drive electrodes.

2. The ASCI of claim 1, wherein scanning the touch sensor panel further comprising:
   stimulating the first drive electrode with a third periodic waveform having a frequency different from the frequencies of the first and second periodic waveforms prior to stimulating the second drive electrode; and
   stimulating the second drive electrode with the third periodic waveform after stimulating the first drive electrode with the first, second, and third periodic waveforms.

3. The ASIC of claim 2, further programmed to reject noise by averaging the capacitance measurements from the two frequencies that provide a best amplitude match and disposing of the capacitance measurement from the remaining frequency.

4. The ASCI of claim 1, wherein the frequencies of the waveforms used for stimulating the drive electrodes follow a frequency hopping pattern that minimizes changes to the frequencies between two consecutive stimuli.

5. The ASCI of claim 1, wherein the frequencies of the first and second periodic waveforms are selected based on a noise environment of the touch sensor panel.

6. The ASIC of claim 1, wherein scanning the touch sensor panel further comprises keeping remaining drive electrodes at ground when one of the drive electrodes is stimulated.

7. The ASIC of claim 1, wherein the pass band of the first frequency does not overlap with the pass band at the second frequency.

8. A computer-implemented method for suppressing noise in a touch sensor panel including a plurality of drive electrodes and a plurality of sense electrodes, the method comprising, in a scan of the touch sensor panel:
   stimulating a first drive electrode of the plurality of drive electrodes with a first periodic waveform and consecutively a second periodic waveform, wherein the second periodic waveform has a frequency different from a frequency of the first periodic waveform;
   stimulating a second drive electrode of the plurality of drive electrodes with the first periodic waveform and consecutively the second periodic waveform, wherein the second drive electrode is stimulated after the stimulation of the first drive electrode; and
   capturing a capacitance measurement from the plurality of sense electrodes in response to each stimulation of the drive electrodes.

9. The method of claim 8, further comprising:
   stimulating the first drive electrode with a third periodic waveform having a frequency different from the frequencies of the first and second periodic waveforms prior to stimulating the second drive electrode; and
   stimulating the second drive electrode with the third periodic waveform after stimulating the first drive electrode with the first, second, and third periodic waveforms.

10. The method of claim 9, further comprising averaging the capacitance measurements from the two frequencies that provide a best amplitude match and disposing of the capacitance measurement from the remaining frequency.

11. The method of claim 8, further comprising setting the frequencies of the waveforms used for stimulating the drive electrodes to follow a frequency hopping pattern that minimizes changes to the frequencies between two consecutive stimuli.

12. The method of claim 8, further comprising selecting the frequencies of the first and second periodic waveforms based on a noise environment of the touch sensor panel.

13. The method of claim 8, further comprising keeping remaining drive electrodes at ground when one of the drive electrodes is stimulated.

14. The method of claim 8, wherein the pass band of the first frequency does not overlap with the pass band at the second frequency.

* * * * *